United States Patent [19]
Kondo

[11] Patent Number: 6,086,512
[45] Date of Patent: Jul. 11, 2000

[54] ELECTRONICALLY CONTROLLED AUTOMATIC TRANSMISSION

[75] Inventor: Shigeki Kondo, Tokyo, Japan

[73] Assignee: Mitsubishi Denki Kabushiki Kaisha, Tokyo, Japan

[21] Appl. No.: 09/309,269

[22] Filed: May 11, 1999

[30] Foreign Application Priority Data

Nov. 19, 1998 [JP] Japan .................................. 10-329661

[51] Int. Cl.$^7$ .................................................. F16H 61/12
[52] U.S. Cl. .......................................... 477/125; 477/906
[58] Field of Search .................................. 477/115, 906, 477/125; 475/254; 74/336 R

[56] References Cited

U.S. PATENT DOCUMENTS

| | | | |
|---|---|---|---|
| 3,665,779 | 5/1972 | Mori ........................................ | 477/125 |
| 4,198,882 | 4/1980 | Kiencke et al. ........................ | 477/125 |
| 4,849,899 | 7/1989 | Cote et al. .............................. | 477/906 |
| 5,016,174 | 5/1991 | Ito et al. ................................. | 477/906 |
| 5,089,965 | 2/1992 | Braun ...................................... | 477/125 |
| 5,738,607 | 4/1998 | Kondo et al. ........................... | 477/125 |
| 5,964,121 | 10/1999 | Steeby et al. .......................... | 477/906 |

FOREIGN PATENT DOCUMENTS

| | | |
|---|---|---|
| 60-11753 | 1/1985 | Japan . |
| 64-3357 | 1/1989 | Japan . |

*Primary Examiner*—Sherry L. Estremsky
*Attorney, Agent, or Firm*—Sughrue, Mion, Zinn, Macpeak & Seas, PLLC

[57] ABSTRACT

In an electronically controlled automatic transmission, when it determines that the position of the selector lever is located at a position other than a neutral position, it compares the time varying ratio of the number of revolutions of the output shaft with a first prescribed value, and when it determines that the time varying ratio is greater than the first prescribed value, a control device performs a temporary gear change prohibiting process to temporarily prohibit a gear change of the automatic transmission. Accordingly, an abnormal state of an output shaft revolution sensor can be sensed without the provision of a vehicle speed reed switch.

7 Claims, 8 Drawing Sheets

ELECTRONICALLY CONTROLLED AUTOMATIC TRANSMISSION

BACKGROUND OF THE INVENTION

1. Field of the Invention

The present invention relates to an electronically controlled automatic transmission capable of sensing a break in an output shaft revolution sensor without the provision of a sensor for sensing a vehicle speed when the break is caused to the output shaft revolution sensor.

2. Description of the Related Art

Figure 1:
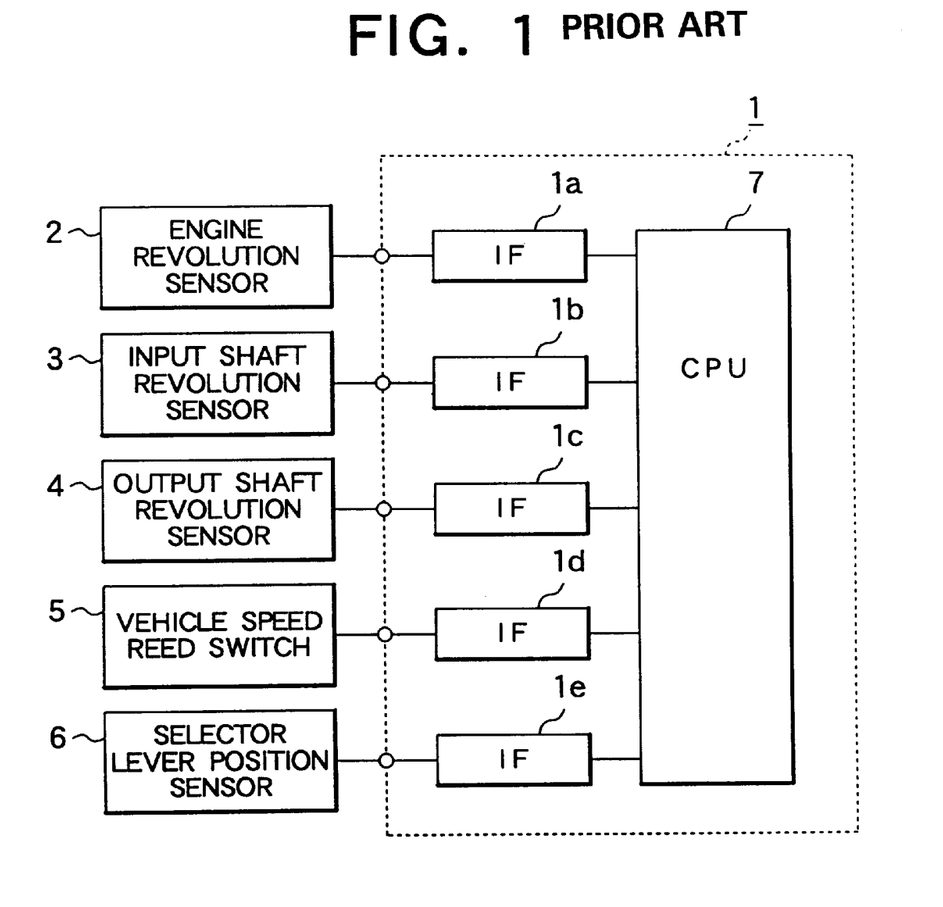
FIG. 1 is a block diagram conceptually showing the arrangement of a conventional electronically controlled automatic transmission.

FIG. 1 is a block diagram conceptually showing the arrangement of a conventional electronically controlled automatic transmission.

In FIG. 1, a control unit 1 for controlling the electronically controlled automatic transmission includes an engine revolution sensor 2, an input shaft revolution sensor 3, an output shaft revolution sensor 4, a vehicle speed reed switch 5 and a selector lever position sensor 6 each connected thereto.

Interfaces (hereinafter, referred to as I/Fs) 1a to 1e are disposed in the control unit 1 to input sensing signals transmitted from the respective sensors (2 to 6) to a CPU 7.

The I/F 1a is an input circuit for inputting the number of revolutions of an engine transmitted from the engine revolution sensor 2 to the CPU 7, and the I/F 1b is an input circuit for inputting the number of revolutions of the input shaft of the transmission transmitted from the input shaft revolution sensor 3 to the CPU 7.

The I/F 1c is an input circuit for inputting the number of revolutions of the output shaft of the transmission transmitted from the output shaft revolution sensor 4 to the CPU 7, and the I/F 1d is an input circuit for inputting the position of a selector lever transmitted from the selector lever position sensor 6 to the CPU 7.

In the conventional electronically controlled automatic transmission as described above, a gear ratio is selected based on the number of revolutions of the output shaft of the transmission and an amount of depression of an accelerator pedal, thereafter a vehicle speed is changed by driving a speed change solenoid (not shown).

Figure 2:
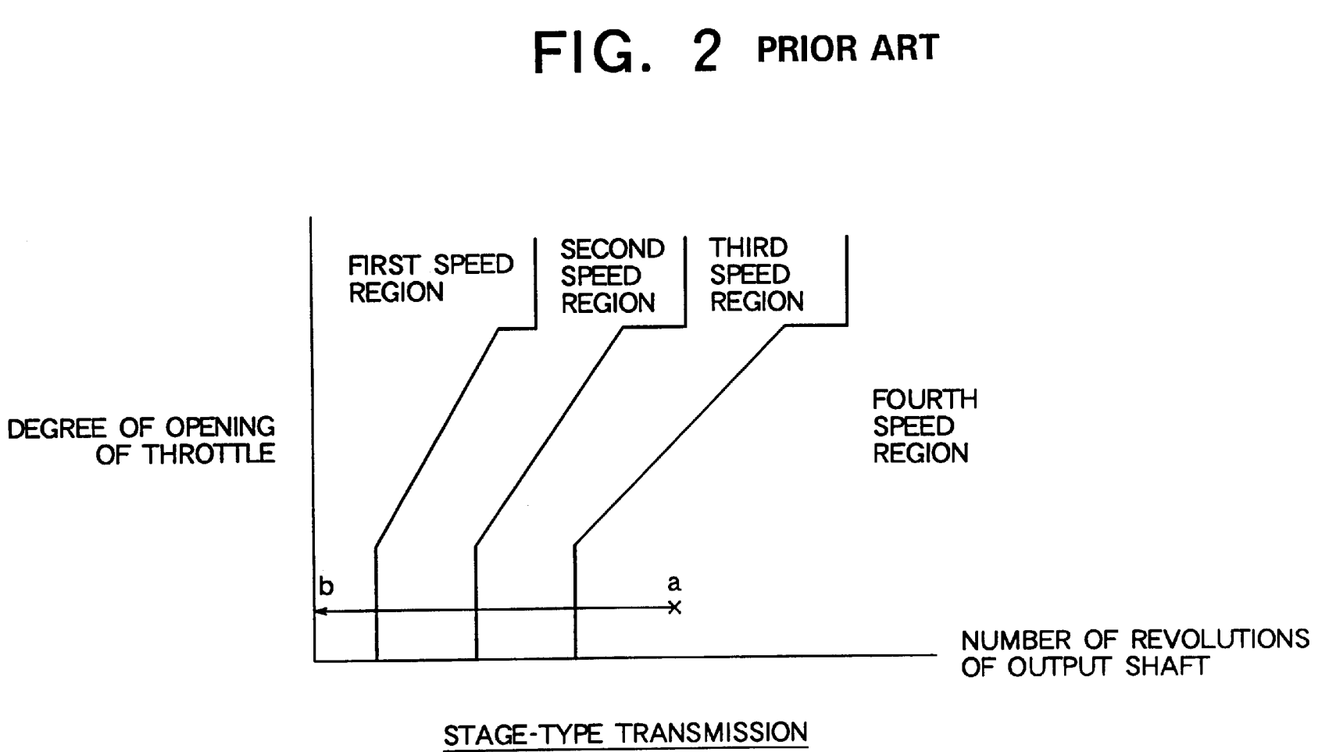
FIG. 2 shows a general gear ratio map of a stage-type electronically controlled automatic transmission.

FIG. 2 shows a general gear ratio map of a stage-type electronically controlled automatic transmission.

Figure 3:
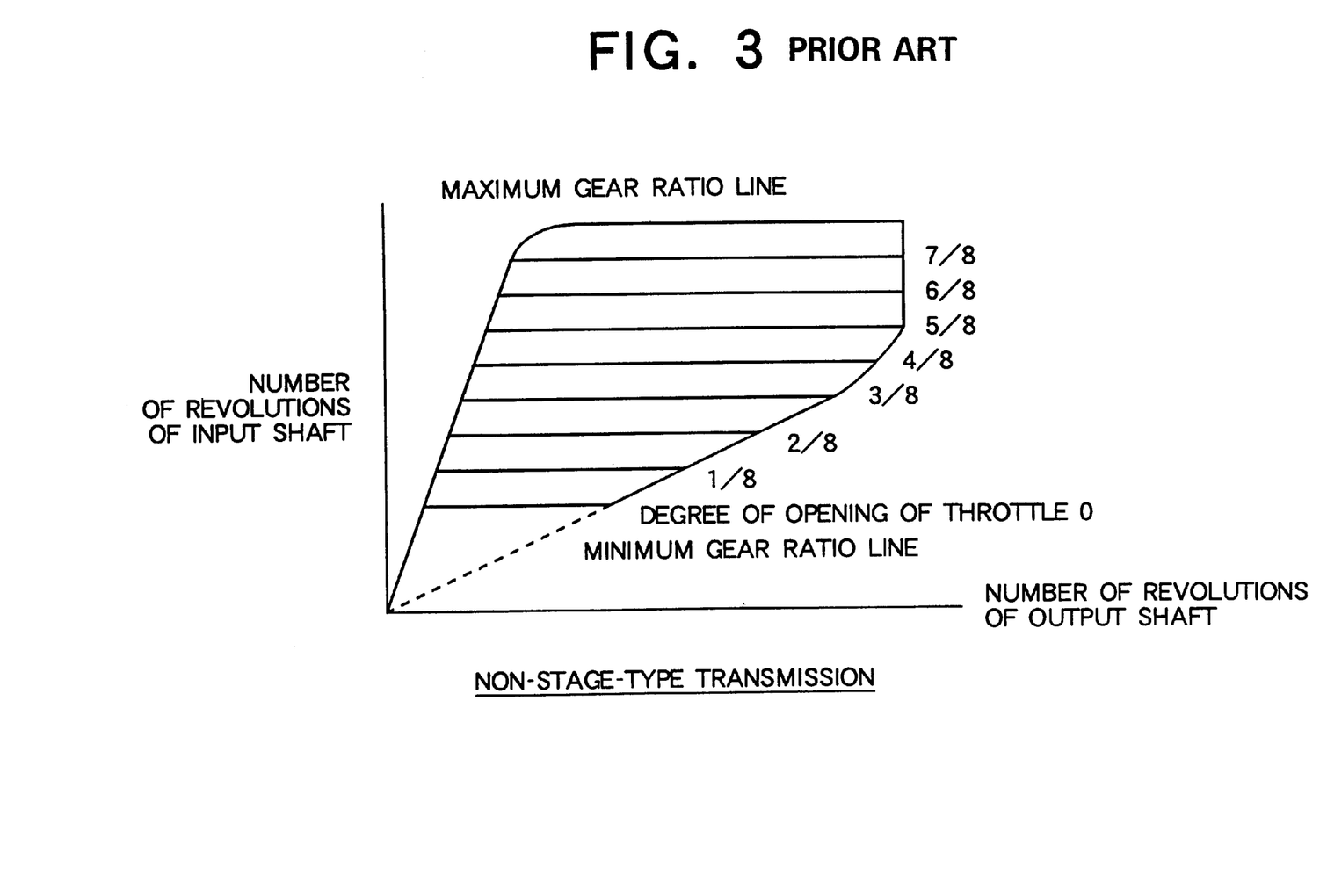
FIG. 3 shows a general gear ratio map of a non-stage type electronically controlled automatic transmission.

FIG. 3 shows a general gear ratio map of a non-stage type electronically controlled automatic transmission.

Figure 4:
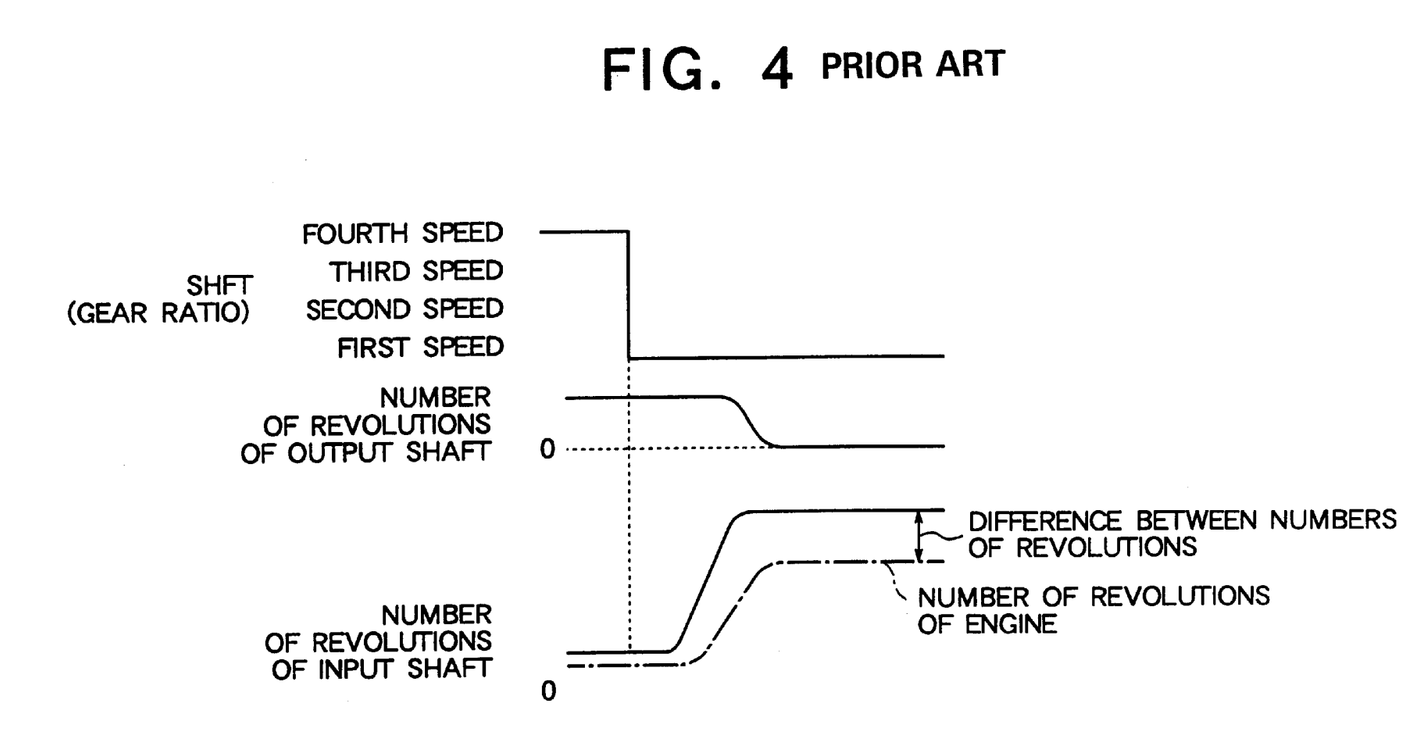
FIG. 4 shows the relationship between the number of revolutions of the input shaft of a transmission and number of revolutions of the output shaft thereof in a shift-down operation.

FIG. 4 shows the relationship between the number of revolutions of the input shaft of a transmission and the number of revolutions of the output shaft thereof in a shift-down operation.

Generally, when the number of revolutions of the output shaft of an automatic transmission is low, a gear ratio on a lowest speed side is selected in view of acceleration ability when an accelerator pedal is depressed.

In the electronically controlled automatic transmission arranged as described above, for example, when a failure such as a brake and the like is caused to the output shaft revolution sensor 4, there arises a situation that a gear ratio on a lowest speed side is selected while the vehicle travels at a high speed, since it is erroneously determined that a vehicle is stoped regardless of the fact that it is actually traveling.

In such a case, since it is abruptly determined that the number of revolutions of the output shaft is zero as shown in FIG. 4, the difference between the number of revolutions of the input shaft and the number of revolutions of the engine is increased. Therefore, there is a possibility of occurrence of an excessive engine braking and an overrun of the engine.

Since the excessive engine braking and the overrun of the engine make the traveling state of the vehicle unstable and may break the vehicle, the failure of the output shaft revolution sensor 4 must be monitored from the viewpoint of securing safety in traveling vehicles and excluding sources of the failure of the vehicles.

For example, according to the invention disclosed in Japanese Unexamined Patent Publication No. 60-11753, a vehicle speed reed switch 5 is provided as a vehicle speed sensor independently of an output shaft revolution sensor 4 to monitor the failure of the output shaft revolution sensor 4 such as a break and the like. The invention has an advantage that the safety can be enhanced by the provision of the vehicle speed reed switch 5 for monitoring the failure of the output shaft revolution sensor 4, at the time the output shaft revolution sensor 4 fails.

There is also available an electronically controlled automatic transmission for monitoring an abnormal state of an output shaft revolution sensor by simply comparing the number of revolutions of the input shaft of a transmission with the number of revolutions of the output shaft thereof as disclosed in Japanese Examined Patent Publication No. 7-107424.

However, since the vehicle speed reed switches 5 used in the electronically controlled automatic transmission disclosed in Japanese Unexamined Patent Publication No. 60-11753 are different for respective types of vehicles, they cannot be mass-produced and are expensive.

Accordingly, there is a problem that it is contrary to a request for cost reduction to provide the expensive vehicle speed reed switch 5 only for monitoring failure.

In the invention disclosed in Japanese Examined Patent Publication No. 7-107424, an abnormal state caused in any of the input shaft revolution sensor and the output shaft revolution sensor can be sensed by the comparison of the number of revolutions of the input shaft with the number of revolutions of the output shaft. However, the invention has a problem that it cannot specify the sensor in which the abnormal state is caused and it cannot determine that the abnormal state is not caused in the sensors and caused by the failure in the transmission (slip of a friction member, a faulty operation of a shift solenoid, a faulty operation of a shift valve, and the like), and thus a failure cannot be analyzed.

Further, when the same connectors are used for the connection of the input shaft revolution sensor and the output shaft revolution sensor, there is also a problem that when the connectors are pulled out, a failure itself cannot be sensed.

SUMMARY OF THE INVENTION

Accordingly, an object of the present invention made to solve the above problems is to provide an electronically controlled automatic transmission capable of sensing a break of an output shaft revolution sensor without the provision of a vehicle speed induction type sensor other than an existing output shaft revolution sensor.

An electronically controlled automatic transmission of the present invention comprises an input shaft revolution sensing means for sensing the number of revolutions of the input shaft of the automatic transmission, an output shaft revolution sensing means for sensing the number of revolutions of the output shaft of the automatic transmission, a selector lever position sensing means for sensing the position of the selector lever of the automatic transmission, and a control means for controlling the gear change of the automatic transmission based on the signals sensed by the input shaft revolution sensing means, the output shaft revolution sensing means, and the selector lever position sensing means, wherein when the control means determines that the position of the selector lever is located at a position other than a neutral position, the control means compares the time varying ratio of the number of revolutions of the output shaft with a first prescribed value, and when the control means determines that the time varying ratio is greater than the first prescribed value, the control means performs a temporary gear change prohibiting process to temporarily prohibit the gear change of the automatic transmission.

It is preferable that the control means compares the above number of revolutions of the output shaft with the number of revolutions of the output shaft at a normal state while the temporary gear change prohibiting process is performed, and when the control means determines that the difference between the number of revolutions of the output shaft at the normal state and the above number of revolutions of the output shaft is smaller than a second prescribed value, the control means releases the temporary gear change prohibiting process.

It is preferable that when the control means determines that the difference between the number of revolutions of the output shaft at the normal state and the above number of revolutions of the output shaft is greater than the second prescribed value, the control means compares the number of revolutions of the input shaft at the normal state with the above number of revolutions of the input shaft, and when the control means determines that the difference between the number of revolutions of the input shaft at the normal state and the above number of revolutions of the input shaft is smaller than a third prescribed value, the control means determines that the output shaft revolution sensing means fails and performs a gear ratio fixing process to fix the gear ratio of the automatic transmission.

It is preferable that when the state that the control means determines that the difference between the number of revolutions of the output shaft at the normal state and the above number of revolutions of the output shaft is greater than the second prescribed value as well as the difference between the number of revolutions of the input shaft at the normal state and the above number of revolutions of the input shaft is greater than the third prescribed value continues for a time longer than a prescribed time, the control means performs the gear ratio fixing process.

It is preferable that the electronically controlled automatic transmission further comprises an engine revolution sensing means for sensing the number of revolutions of an engine, wherein when the control means determines that the difference between the number of revolutions of the output shaft at the normal state and the above number of revolutions of the output shaft is greater than the second prescribed value, the control means compares the number of revolutions of the input shaft at the normal state and the above number of revolutions of the input shaft with the third prescribed value, when the control means determines that the difference between the number of revolutions of the input shaft at the normal state and the above number of revolutions of the input shaft is greater than the third prescribed value, the control means compares the above number of revolutions of the output shaft and the above number of revolutions of the input shaft with a fourth prescribed value and a fifth prescribed value, respectively, when the control means determines that the above number of revolutions of the output shaft and the above number of revolutions of the input shaft are smaller than the fourth prescribed value and the fifth prescribed value, respectively, the control means compares the above number of revolutions of the engine with a sixth prescribed value, and when the control means determines that the above number of revolutions of the engine is smaller than the sixth prescribed value, the control means releases the temporary gear change prohibiting process.

It is preferable that when the control means releases the temporary gear change prohibiting process, the control means performs a slow shift-down operation for shifting down slower than the normal state.

It is preferable that the control means determines the gear position of the automatic transmission when it performs the slow shift-down operation, and when the control means confirms that the gear position is on a lowest speed side, the control means releases the slow shift-down operation.

DESCRIPTION OF THE PREFERRED EMBODIMENTS

Embodiment 1

Figure 5:
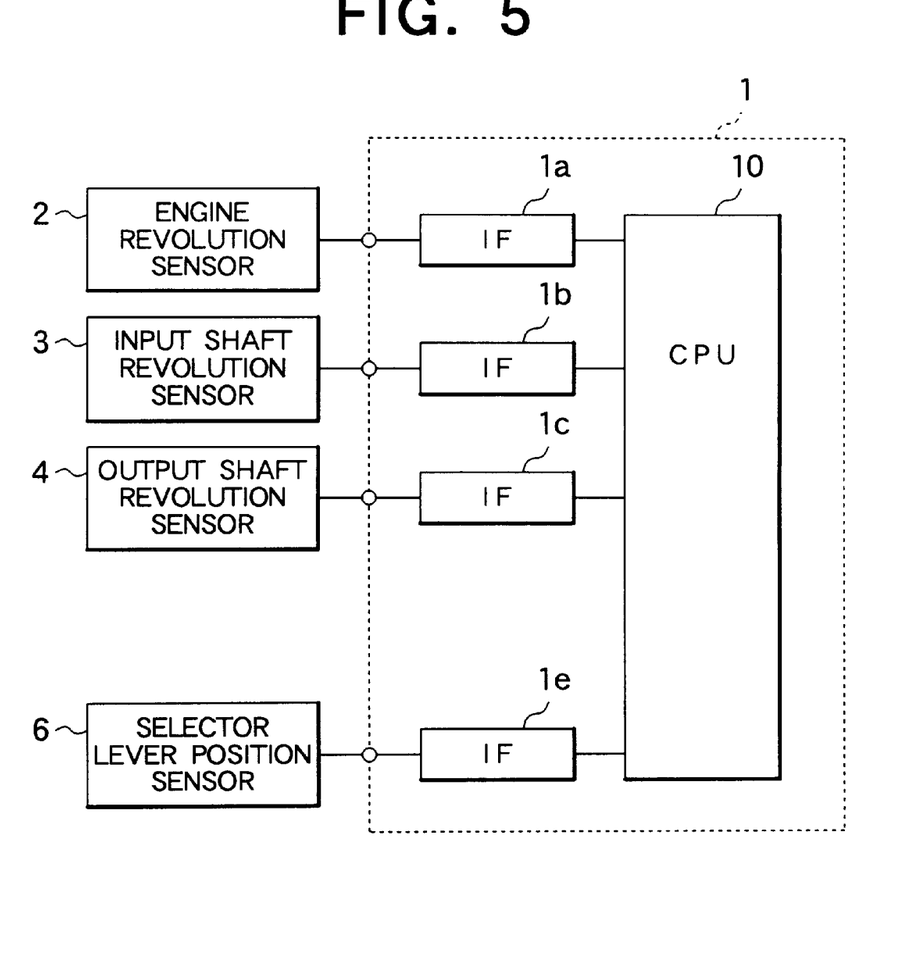
FIG. 5 is a block diagram showing the arrangement of an electronically controlled automatic transmission according to an embodiment 1 of the present invention.

FIG. 5 is a block diagram showing the arrangement of an electronically controlled automatic transmission according to the embodiment 1 of the present invention.

As shown in FIG. 5, the electronically controlled automatic transmission according to the embodiment 1 of the present invention is arranged such that the vehicle speed reed switch 5 and the IF 1d used in the conventional electronically controlled automatic transmission is removed therefrom and a CPU 10 as a control means is provided therewith.

In FIG. 5, an engine revolution sensor 2 acts as an engine revolution sensing means, an input shaft revolution sensor 3 acts as an input shaft revolution sensor, an output shaft revolution sensor 4 acts as an output shaft revolution means and a selector lever position sensor 6 acts as a selector lever position sensing means.

The content of the present invention will be described below in accordance with the operation of the CPU 10.

Figure 6:
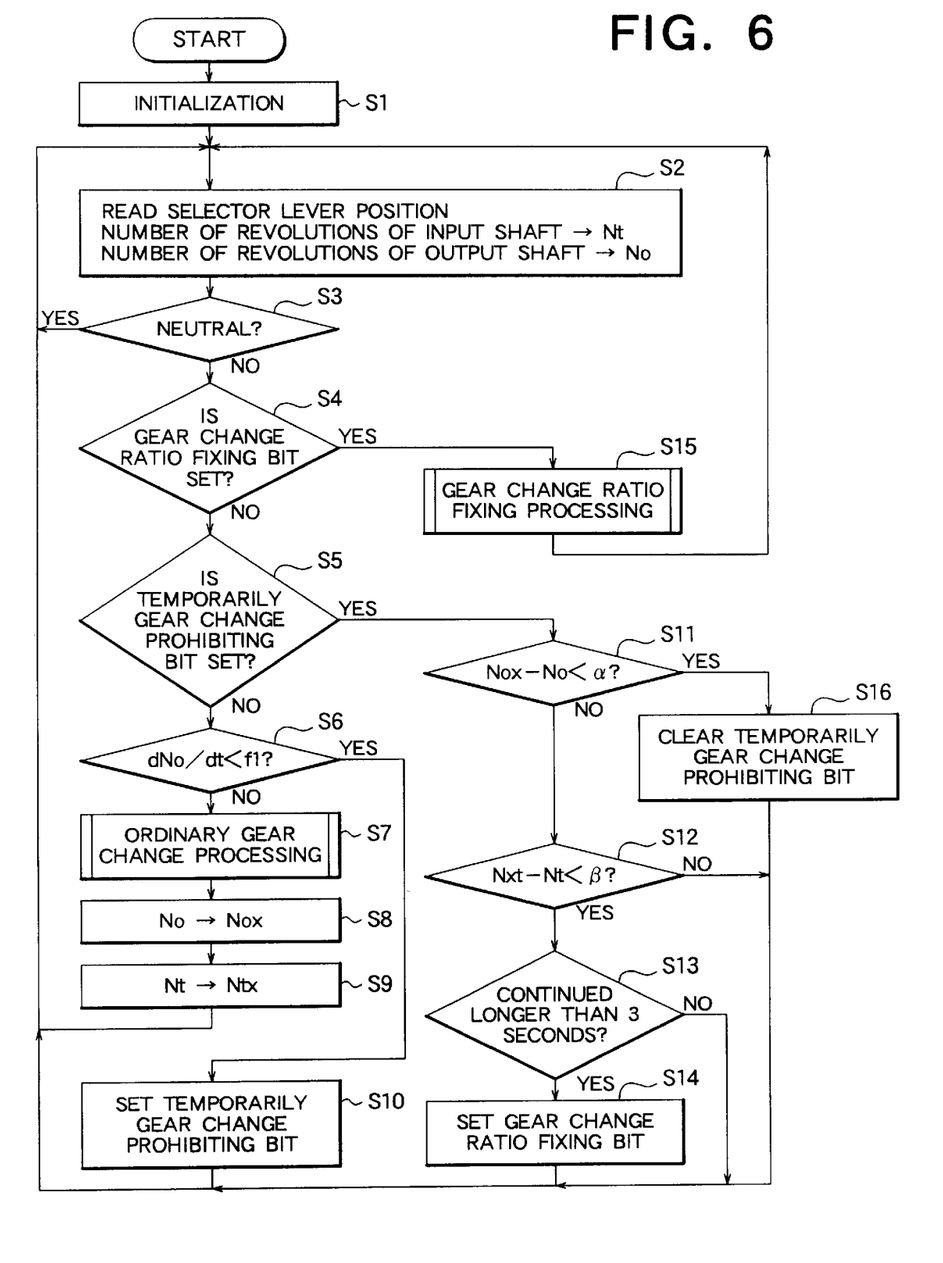
FIG. 6 is a flowchart showing how the electronically controlled automatic transmission of the embodiment 1 of the present invention is controlled.

FIG. 6 is a flowchart showing how the electronically controlled automatic transmission according to the embodiment 1 of the present invention is controlled. All the control processes shown below will be executed in the CPU 10.

As shown in FIG. 6, the CPU 10 is initialized at step S1. Then, at step S2, the position of a selector lever is read to the CPU 10 as well as the number of revolutions of input shaft Nt and the number of revolutions of output shaft No are also input to the CPU 10. At step S3, it is determined whether the selector lever is located at a neutral position or not. When the selector lever is located at the neutral position, the flow returns to step S2, whereas when it is located at a position other than the neutral position, the flow goes to step S4.

At step 4, it is determined whether a gear ratio fixing bit is set or not. Although the gear ratio fixing bit is set at step S14 to be described later, when it is not set, the flow goes to step S5 where it is determined whether a temporary gear change prohibiting bit is set or not.

When it is determined at step S5 that the temporary gear change prohibiting bit is not set, the time varying ratio of the number of revolutions of output shaft dNo/dt is calculated at step S6 and it is determined whether dNo/dt<F1 is established or not with respect to a prescribed value F1 as a first prescribed value.

The prescribed value F1 is a negative value determined on the basis of the gear ratios of respective gears and a vehicle speed and given based on, for example, a gear ratio which is selectable at the vehicle speed, and the like. Therefore, the time varying ratio of the number of revolutions of output shaft dNo/dt which satisfies dNo/dt<F1 at step S6 is a negative value in deceleration, and when the absolute value of the negative value is greater than the absolute value of the prescribed value F1, the aforementioned condition (dNo/dt<F1) is satisfied.

When dNo/dt<F1 is not established at step S6, since it is determined that no abnormal state is caused to a vehicle, the flow goes to step S7 and an ordinary gear change process is performed. The flow further goes to step S8, and the number of revolutions of output shaft No at the time is stored in the CPU 10 as the number of revolutions of output shaft Nox at a normal state. Further, at step S9, the number of revolutions of input shaft Nt is stored in the CPU 10 as the number of revolutions of input shaft Ntx at the normal state, and the flow returns to step S2.

Unless an abnormal state is not caused to the output shaft revolution sensor 4, step S1 to step S9 are repeated.

On the other hand, when it is determined that dNo/dt<F1 is established at step S6, the flow goes to step S10 and the temporary gear change prohibiting bit is set.

More specifically, when the time varying ratio of the number of revolutions of output shaft dNo/dt is greater than, for example, the time varying ratio of the number of revolutions of output shaft determined from a maximum gear ratio, a gear change is temporarily prohibited because there is a possibility that an abnormal state is caused to the output shaft revolution sensor 4.

When the temporary gear change prohibiting bit is set at step S10, the flow returns to step S10. When it is not determined that the position of the selector lever is located at the neural position, it is determined that the temporary gear change prohibiting bit is set at step S5 and the flow goes to step S11.

It is determined at step S11 whether Nox−No<α is established or not with respect to the difference between the number of revolutions of output shaft Nox at the normal state and a prescribed value α as a second prescribed value.

At the time, when the number of revolutions of output shaft No is less than a value obtained by subtracting the prescribed value α from the number of revolutions of output shaft Nox at the normal state, there is possibility that any abnormal state is caused to the output shaft revolution sensor 4.

The prescribed value α may be changed in accordance with a vehicle speed.

When Nox−No<α is not established, the flow goes to step 12 and it is determined whether Ntx−Nt<β is established or not with respect to the difference between the number of revolutions of input shaft Ntx at the normal state and a prescribed value β as a third prescribed value.

When the number of revolutions of input shaft Nt is higher than the prescribed value (Ntx−β) in the situation that there is a possibility that an abnormal state is caused to the output shaft revolution sensor 4, it is conceived that the possibility that the abnormal state is caused to the output shaft revolution sensor 4 is more increased.

The prescribed value β may be changed in accordance with the vehicle speed.

When Ntx−Nt<β is not established at step S12, the flow returns to step 2. More specifically, the flow is returned because both the number of revolutions of output shaft No and the number of revolutions of input shaft Nt are low at the time and accordingly it is not conceived that an abnormal state is caused to the output shaft revolution sensor 4.

On the other hand, when Ntx−Nt<β is established at step S12, the flow goes to step S13 to finally determine whether an abnormal state is caused to the output shaft revolution sensor 4 or not because there is a high possibility of the occurrence of it.

It is determined at step S13 whether or not the situation that Nox−No<α is not established and Ntx−Nt<β is established has continued for at least 3 seconds.

When it is determined that the above situation has continued for at least 3 seconds, it is determined that an abnormal state is caused to the output shaft revolution sensor 4 and the flow goes to step S14.

At step S14, the gear change fixing bit is set to prohibit the gear change and a gear ratio which least obstructs the travel of the vehicle is selected as well as the gear change is completely prohibited.

The gear ratio which least obstructs the travel of the vehicle is a third speed gear ratio in a stage-type transmission or a highest speed gear ratio in a non-stage-type transmission.

When the gear ratio fixing bit is set at step S14 as described above, since it is determined that the gear ratio fixing bit is set at step S4 after the flow returns to step S4, the flow goes to step S15.

A gear ratio fixing process is performed at step S15 to prohibit the gear change. More specifically, a gear at the time is fixed in the stage-type transmission, whereas a gear ratio at the time is fixed by fixing the width of a pulley in the non-stage-type transmission. Thereafter, the flow returns to step S2.

When it is determined that Nox−No<α is established at step S11, the flow goes to step S16 and the temporary gear ratio fixing bit is cleared.

More specifically, since it is not conceived that an abnormal state is caused to the output shaft revolution sensor 4 when the number of revolutions of output shaft No is greater than the prescribed value (Nox−α), the temporary gear ratio prohibiting bit set at step S5 is cleared and the ordinary gear change process is performed.

When it is determined at step S12 that Ntx−Nt<β is not established, the flow returns to step S2 and a control process is performed in the path from step 5 to step S11.

Likewise, when it is determined that the situation that Nox−No<α is not established and Ntx−Nt<β is established has not continued for at least 3 seconds, the flow also returns to step S2 and the control process is performed in the path from step 5 to step 11.

As described above, in the electronically controlled automatic transmission according to the embodiment 1 of the present invention which uses only the output shaft revolution sensor 4 as a sensor for sensing a vehicle speed, since an abnormal state such as a break and the like caused to the output shaft revolution sensor 4 can be sensed by monitoring the time varying ratio dNo/dt of the number of revolutions of output shaft No, a vehicle speed reed switch need not by provided, by which the cost of the transmission can be reduced.

Further, when the number of revolutions of output shaft No is abruptly reduced, since it is determined there is a possibility that the abnormal state such as the break and the like is caused to the output shaft revolution sensor 4, the gear change is temporarily prohibited. Further, when the above state continues for a prescribed period of time, the gear ratio which least obstructs the travel of the vehicle is selected as well as the gear change is completely prohibited. Accordingly, even if the break and like are actually caused to the output shaft revolution sensor 4, an excessive engine brake is not occurred by an abrupt shit-down operation so that safety can be secured while the vehicle travels.

Embodiment 2

Figure 7:
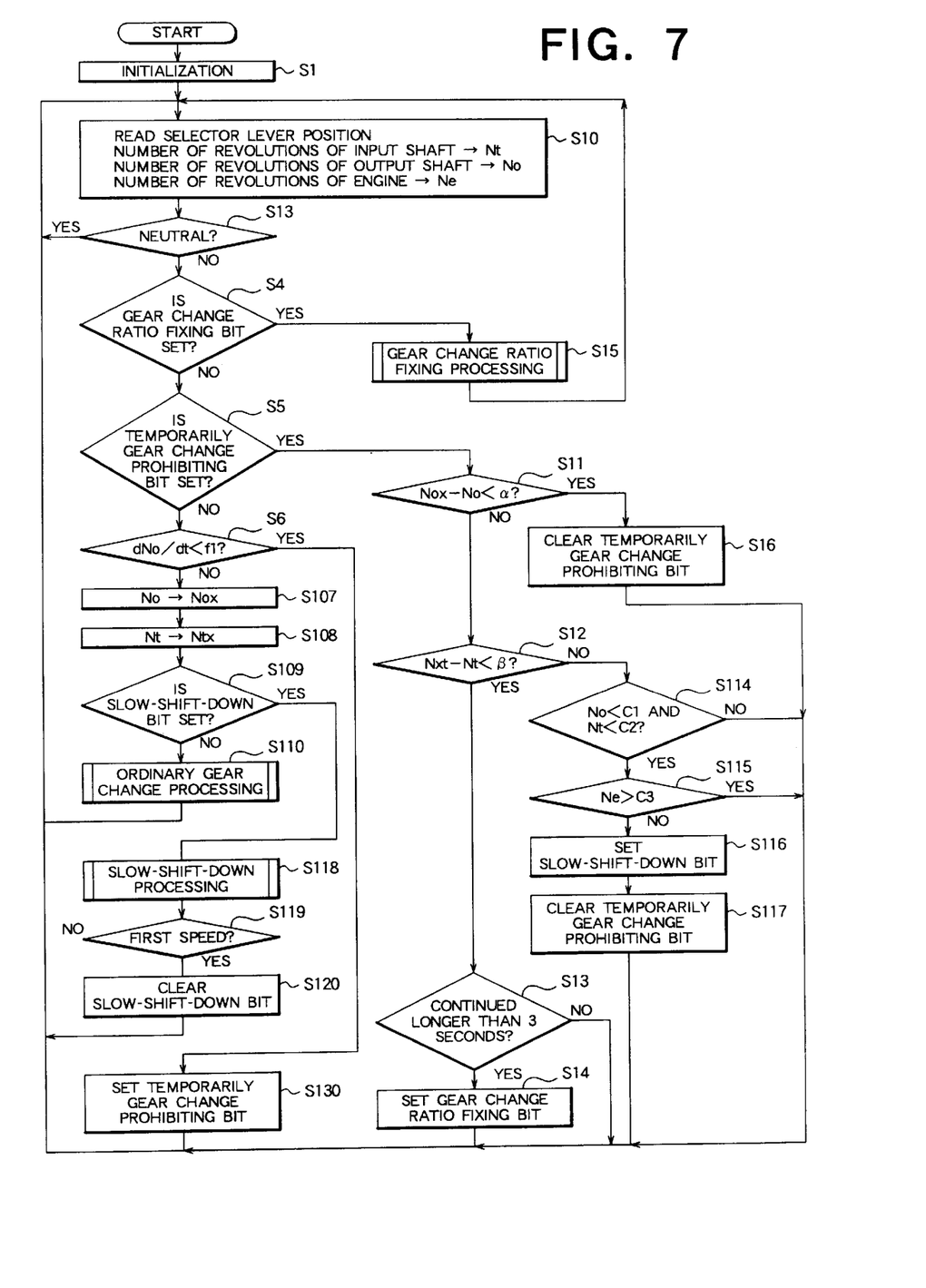
FIG. 7 is a flowchart showing how the electronically controlled automatic transmission according to an embodiment 2 of the present invention is controlled.

FIG. 7 is a flowchart showing how the electronically controlled automatic transmission according to an embodiment 2 of the present invention is controlled.

In FIG. 7, the same numbers as used in the flowchart of FIG. 6 are used to denote the same steps and the description of the steps is omitted.

In the electronically controlled automatic transmission according to the embodiment 2 of the present invention, when it is determined that an abnormal state is caused to an output shaft revolution sensor 4, the same process as that in the embodiment 1 is performed as shown in FIG. 7.

The electronically controlled automatic transmission according to the embodiment 2 has a feature that after a temporary gear change prohibiting bit is cleared at step S16, a slow shift-down operation is performed to execute sift-down slower than that executed in ordinary traveling.

In FIG. 7, after a CPU 10 is initialized at step S1, the CPU 10 reads the position of a selector lever, the number of revolutions of input shaft Nt of the transmission, the number of revolutions of output shaft No thereof and the number of revolutions of engine Ne at step S102.

After the step S102, the flow goes from step S3 to step S6.

Step S106 has the same content as that of step S6 in the embodiment 1. When it is determined at step S6 that dNo/dt<F1 is not established as to the time varying ratio dNo/dt of the number of revolutions of output shaft No and a prescribed value F1, the flow goes to step S107. At step S107, the number of revolutions of output shaft No is stored in the CPU 10 as the number of revolutions of output shaft Nox at the normal state.

Likewise, at step S108, the number of revolutions of input shaft Nt at the time is stored in the CPU 10 as the number of revolutions of input shaft Ntx at the normal state.

Further, the flow goes to step S109 where it is determined whether a slow-shift-down bit is set or not. When it is determined that the slow-shift-down bit is not set, an ordinary gear change operation is performed at step S10.

Note, unless an abnormal state is caused to the output shaft revolution sensor 4, step S1 to step S9 are repeated.

When it is determined at step S6 that dNo/dt<F1 is established, the flow goes to step S130.

The step S130 has the same content as that of the step 10 of the embodiment 1. Accordingly, temporary gear change prohibiting bit is set at step S130.

Then, the flow returns to step S102, and when it is not determined at step S3 that a selector lever is located at a neutral position, the flow goes to step S11.

It is determined at step S11 whether Nox−No<α is established or not likewise the embodiment 1. When Nox−No<α is not established, the flow goes to step S12 where it is determined whether Ntx−Nt<β is established or not with respect to the difference between the number of revolutions of input shaft Ntx at the normal state and a prescribed value β.

When Ntx−Nt<β is established at step S12, the flow goes to step S13 likewise the embodiment 1.

It is determined at step S13 whether or not the situation that Nox−No<α is not established and Ntx−Nt<β is established has continued at least 3 seconds. When it is determined that the above situation has continued for at least 3 seconds, the flow goes to step S14 likewise the embodiment 1.

A gear ratio fixing bit is set at step S14 to prohibit a gear change.

When the gear ratio fixing bit is set at step 14 as described above, the flow returns to step S2. Since it is determined at step S4 that the gear ratio fixing bit is set after the flow returns to step S2, the flow goes to step S15.

At step S15, a gear ratio fixing process is performed likewise in the embodiment 1 to prohibit the gear change and then the flow return to step S2. When it is determined at step S11 that Nox−No<α is established, the flow goes to step S16 likewise in the embodiment 1 and the temporary gear ratio fixing bit is cleared.

When it is determined at step S11 that Nox−No<α is not established, the flow goes to step S12 where it is determined whether Ntx−Nt<β is established or not. When it is determined at step A12 that Ntx−Nt<β is not established, the flow goes to step S114 where it is determined whether No<C1 and Nt<C2 are established or not as to the number of revolutions of output shaft No, the number of revolutions of input shaft Nt, a prescribed value C1 as a fourth prescribed value and a prescribed value C2 as a fifth prescribed value.

When it is determined at step S11 and step S12 that both the number of revolutions of output shaft No and the number of revolutions of input shaft Nt are apparently lower than values at the normal state, there is a possibility that this is caused by an abnormal state arisen in the output shaft revolution sensor 4. However, step S114 is executed to secure the cruising property of the vehicle because the possibility that this is caused by the reduction of a vehicle speed in the normal state due to tire lock made by hard braking on a low μ load cannot be denied.

More specifically, even if it is determined at step S11 and step S12 that both the number of revolutions of output shaft No and the number of revolutions of input shaft Nt are apparently lower than the values at the normal state, there is also a possibility that the vehicle is stopped short because the tires are locked by hard braking. At the time, since the gear change is temporarily prohibited, the vehicle starts at a gear ratio on a higher speed side as tires are unlocked. Thus, if the tires are locked by the hard braking, the cruising property of the vehicle may be greatly lowered. Accordingly, it is determined in the process executed at step S114 that there is a possibility that the tires are locked when both the number of revolutions of output shaft No and the number of revolutions of input shaft Nt are lowered.

The prescribed values C1 and C2 may be set to prescribed values which do not depend on the number of revolutions of an engine or may be changed depending upon the vehicle speed.

When No<C1 and Nt<C2 are established at step S114, the flow goes to step S115 where it is determined whether Ne>C3 is established or not as to the number of revolutions of engine Ne and a prescribed value C3 as a sixth prescribed value.

More specifically, when both the number of revolutions of output shaft No and the number of revolutions of input shaft Nt are low because there is a possibility of the tire lock, the number of revolutions of engine Ne is checked to perform the shift-down operation to improve the cruising property of the vehicle. A value which does not cause the overrun of the engine even if the shift-down operation is performed may be employed as the prescribed value C3. More specifically, it is sufficient to use a value of 70 to 80% of the allowable number of revolutions of the engine.

It cannot be confirmed at step S115 whether an abnormal state is caused to the output shaft revolution sensor 4 and an input shaft number of rotation sensor 3 or the tires are locked. Accordingly, when it is determined that the number of revolutions of engine Ne is higher than the prescribed value C3, the flow returns to step S2 as it is because the cruising property is not injured even if the temporary gear change prohibition is continued. Whereas, when it is determined that the number of revolutions of engine Ne is lower than the prescribed value C3, it is preferable to prohibit the gear change when the output shaft revolution sensor 4 and the input shaft number of rotation sensor 3 are in the abnormal state. However, when the tires are locked and the vehicle is stopped short, it is preferable to perform the shift-down operation to make preparation for the next movement of the vehicle. However, when the shift-down operation is performed in an ordinary manner, since there is a possibility that the engine is overrun or an engine brake is abruptly occurred, a slow shift-down bit is set at step 116 to perform the shift-down operation slower than that performed ordinarily.

Then, the flow returns to step S102 after the temporary gear ratio prohibiting bit is cleared at step S117 to perform the shift-down operation slowly.

Unless it is determined that a shift lever is located at a neutral position at step 3 after the flow returns from step S117 to step S102, since it is determined at step S109 that the slow shift-down bit is set at step S109, the flow goes to step S118.

The shift-down operation is performed at step S118 slower than that performed ordinarily (slow shift-down) and the flow goes to step S119. When the number of revolutions of engine approaches the maximum permissive number of revolution of engine, the temporary gear change prohibiting flag may be set again from the view point that the failure of the output shaft revolution sensor 4 cannot be discriminated from the tire lock.

It is determined at step S119 whether a gear is set to a first speed or not. Note, in a non-stage-type transmission, it is determined whether a gear ratio is set to a lowest speed side or not.

When a gear position is not set to the first speed position, the flow returns to step S102 and is repeated until the gear position is set to the first speed position.

When it is determined that the gear position is set to the first speed position, the flow goes to step S120 and the slow shift-down bit is cleared.

When it is determined that the conditions at steps S13, S114 and S115 are not established, the flow returns to step S102.

Figure 8:
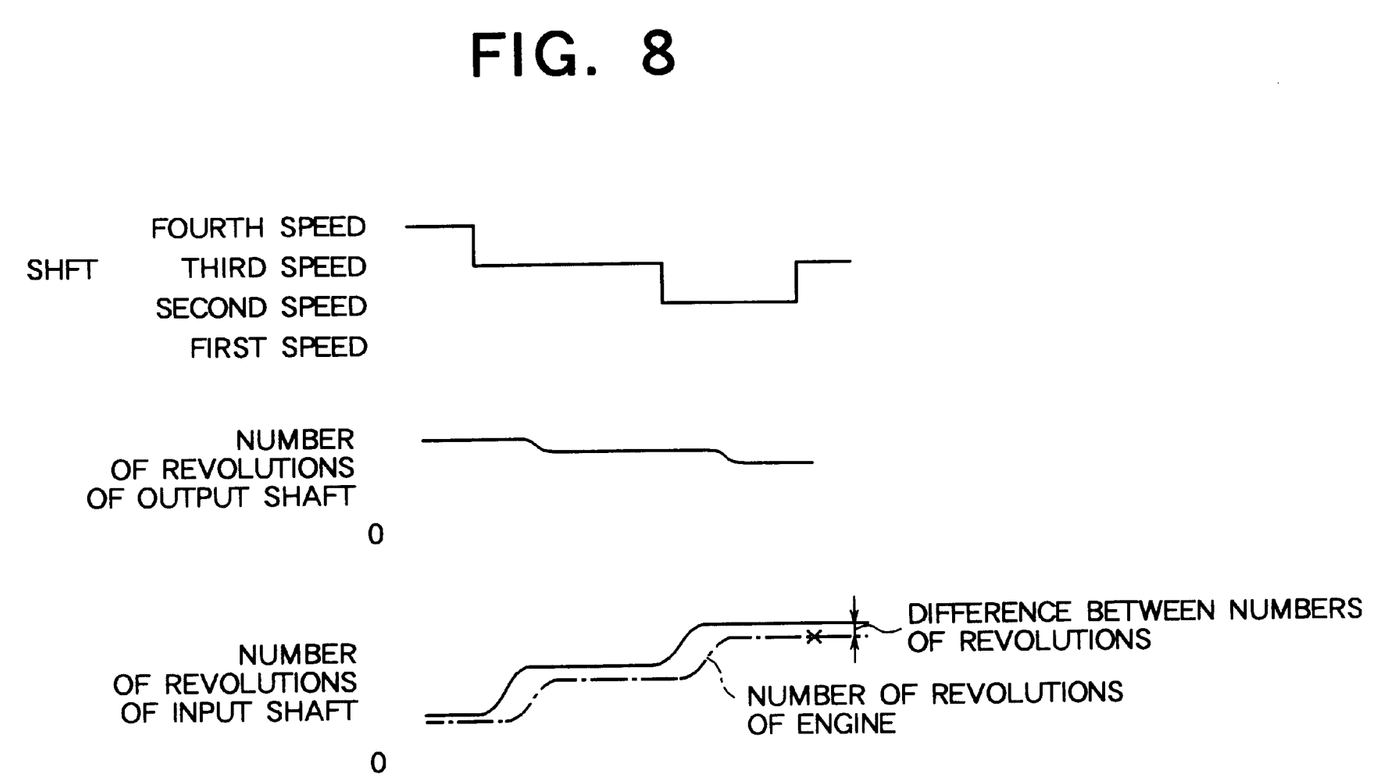
FIG. 8 shows the relationship between the number of revolutions of the input shaft of the electronically controlled automatic transmission of the present invention and the number of revolutions of the output shaft thereof when the transmission is shifted down.

FIG. 8 shows the relationship between the number of revolutions of the input shaft of the electronically controlled automatic transmission of the present invention and the number of revolutions of the output shaft thereof when the transmission is shifted down.

As described above, when there is a possibility that an abnormal state is caused to the output shaft revolution sensor 4 in the electronically controlled automatic transmission according to the embodiment 2 of the present invention, the shift-down operation is performed slower than that performed ordinarily (slow shift-down operation).

Therefore, when it cannot be determined whether an abnormal state is caused to the output shaft revolution sensor 4 or the tires are locked, the difference between the number of revolutions of input shaft Nt and the number of revolutions of output shaft No can be reduced to thereby suppress the occurrence of an abrupt engine brake as shown in FIG. 8.

As described above, in the electronically controlled automatic transmission according to the embodiment 2 of the present invention, since an abnormal state such as a break and the like caused to the output shaft revolution sensor 4 can be sensed without the provision of a vehicle speed reed switch likewise the embodiment 1, the cost of the transmission can be reduced as well as the safety of a vehicle can be secured while it travels.

Further, when there is a possibility that an abnormal state such as a break and the like is caused to the output shaft revolution sensor 4, since the shift-down operation is performed slower (slow shift-down operation) than that performed when a vehicle travels ordinarily, there can be provided an electronically controlled automatic transmission which is safer at a lower cost.

The electronically controlled automatic transmission of the present invention is characterized by comprising an input shaft revolution sensing means for sensing the number of revolutions of the input shaft of the automatic transmission, an output shaft revolution sensing means for sensing the number of revolutions of the output shaft of the automatic transmission, a selector lever position sensing means for sensing the position of the selector lever of the automatic transmission, and a control means for controlling the gear change of the automatic transmission based on the signals sensed by said input shaft revolution sensing means, said output shaft revolution sensing means, and said selector lever position sensing means, wherein when it determines that the position of the selector lever is located at a position other than a neutral position, it compares the time varying ratio of the number of revolutions of the output shaft with a first prescribed value, and when it determines that the time varying ratio is greater than the first prescribed value, the control means performs a temporary gear change prohibiting process to temporarily prohibit the gear change of the automatic transmission. Accordingly, an abnormal state of an output shaft revolution sensor can be sensed without the provision of a vehicle speed reed switch.

The control means is characterized in that it compares the above number of revolutions of the output shaft with the number of revolutions of the output shaft at a normal state while the temporary gear change prohibiting process is performed, and when the control means determines that the difference between the number of revolutions of the output shaft at the normal state and the above number of revolutions of the output shaft is smaller than a second prescribed value, it releases the temporary gear change prohibiting process. Accordingly, the cost of the transmission can be reduced without the provision of a vehicle speed reed switch, and further even if a break and the like are actually caused to the output shaft revolution sensor, the safety of the vehicle can be secured while it travels without the occurrence of an excessive engine brake caused by abrupt shift-down.

The control means is characterized in that when it determines that the difference between the number of revolutions of the output shaft at the normal state and the above number of revolutions of the output shaft is greater than the second prescribed value, it compares the number of revolutions of the input shaft at the normal state with the above number of revolutions of the input shaft, and when it determines that the difference between the number of revolutions of the output shaft at the normal state and the above number of revolutions of the output shaft is smaller than a third prescribed value, it determines that the output shaft revolution sensing means fails and performs a gear ratio fixing process to fix the gear ratio of the automatic transmission. Accordingly, the cost of the transmission can be reduced, and further even if a break and the like are actually caused to the output shaft revolution sensor, the safety of a vehicle can be secured while it travels without the occurrence of an excessive engine brake caused by abrupt shift-down.

The control means is characterized in that when the state that it determines that the difference between the number of revolutions of the output shaft at the normal state and the above number of revolutions of the output shaft is greater than the second prescribed value as well as the difference between the number of revolutions of the input shaft at the normal state and the above number of revolutions of the input shaft is greater than the third prescribed value continues for a time longer than a prescribed time, the control means performs the gear ratio fixing process. Accordingly, the cost of the transmission can be reduced, and further even if a break and the like are actually caused to the output shaft revolution sensor, the safety of the vehicle can be secured while it travels without the occurrence of an excessive engine brake caused by abrupt shift-down.

The electronically controlled automatic transmission of the present invention further comprises an engine revolution sensing means for sensing the number of revolutions of an engine, wherein when the control means determines that the difference between the number of revolutions of the output shaft at the normal state and the above number of revolutions of the output shaft is greater than the second prescribed value, the control means compares the number of revolutions of the input shaft at the normal state and the above number of revolutions of the input shaft with the third prescribed value, when the control means determines that the difference between the number of revolutions of the input shaft at the normal state and the above number of revolutions of the input shaft is greater than the third prescribed value, it compares the above number of revolutions of the output shaft and the above number of revolutions of the input shaft with a fourth prescribed value and a fifth prescribed value, respectively, when the control means determines that the above number of revolutions of the output shaft and the above number of revolutions of the input shaft are smaller than the fourth prescribed value and the fifth prescribed value, respectively, it compares the above number of revolutions of the engine with a sixth prescribed value, and when the control means determines that the above number of revolutions of the engine is smaller than the sixth prescribed value, it releases the temporary gear change prohibiting process. Accordingly, even if the number of revolutions of the output shaft is abruptly changed by tire lock in such a degree as to cause erroneous determination that an abnormal state arises in the output shaft revolution sensor, a vehicle speed is not kept to a high speed gear ratio and can be changed to a low speed gear ratio.

When the control means releases the temporary gear change prohibiting process, it performs a slow shift-down operation for shifting down the automatic transmission slower than the normal state. Accordingly, the safety of the vehicle can be secured.

The control means determines the gear position of the automatic transmission when it performs the slow shift-down operation, and when the control means confirms that the gear position is on a lowest speed side, it releases the slow shift-down operation. Accordingly, the safety of the vehicle can be secured. Further, when a failure arises in the interior of the automatic transmission, the number of revolutions of the input shaft ordinarily begins to change and the number of revolutions of the output shaft does not so much change. Therefore, the present invention can determine the failure in the interior of the automatic transmission based on the change of the number of revolutions of the output shaft as a condition for beginning to determine that the output shaft revolution sensor is in an abnormal state.

What is claimed is:

1. An electronically controlled automatic transmission for a vehicle engine, said transmission comprising:

a) an input shaft revolution sensing means for sensing the number of revolutions of the input shaft of the automatic transmission;

b) an output shaft revolution sensing means for sensing the number of revolutions of the output shaft of the automatic transmission;

c) a selector lever position sensing means for sensing the position of a selector lever of the automatic transmission; and d) a control means for controlling a gear change of the automatic transmission based on signals sensed by the input shaft revolution sensing means, the output shaft revolution sensing means, and the selector lever position sensing means, said control means including means for preventing an erroneous downshifting of the transmission and attendant engine braking and engine speed overrun in response to a failure of said output shaft revolution sensing means, e) said preventing means functioning such that when said control means determines that the position of the selector lever is located at a position other than a neutral position, said control means compares a time varying ratio of the number of revolutions of the output shaft with a first prescribed value, and when said control means determines that the time varying ratio is greater than the first prescribed value, the control means performs a temporary gear change prohibiting process to temporarily prohibit the gear change of the automatic transmission.

2. An electronically controlled automatic transmission according to claim 1, wherein said control means compares the number of revolutions of the output shaft with the number of revolutions of the output shaft at a normal state while the temporary gear change prohibiting process is performed, and when said control means determines that the difference between the number of revolutions of the output shaft at the normal state and the number of revolutions of the output shaft is smaller than a second prescribed value, said control means releases the temporary gear change prohibiting process.

3. An electronically controlled automatic transmission according to claim 2, wherein when said control means determines that the difference between the number of revolutions of the output shaft at the normal state and the number of revolutions of the output shaft is greater than the second prescribed value, said control means compares the number of revolutions of the input shaft at the normal state with the number of revolutions of the input shaft, and when said control means determines that the difference between the number of revolutions of the input shaft at the normal state and the number of revolutions of the input shaft is smaller than a third prescribed value, said control means determines that said output shaft revolution sensing means fails and performs a gear ratio fixing process to fix the gear ratio of the automatic transmission.

4. An electronically controlled automatic transmission according to claim 3, wherein when the state that said control means determines that the difference between the number of revolutions of the output shaft at the normal state and the number of revolutions of the output shaft is greater than the second prescribed value as well as the difference between the number of revolutions of the input shaft at the normal state and the number of revolutions of the input shaft is greater than the third prescribed value continues for a time longer than a prescribed time, said control means performs the gear ratio fixing process.

5. An electronically controlled automatic transmission according to claim 3, further comprising an engine revolution sensing means for sensing the number of revolutions of an engine, wherein when said control means determines that the difference between the number of revolutions of the output shaft at the normal state and the number of revolutions of the output shaft is greater than the second prescribed value, said control means compares the number of revolutions of the input shaft at the normal state and the number of revolutions of the input shaft with the third prescribed value;

when said control means determines that the difference between the number of revolutions of the input shaft at the normal state and the number of revolutions of the input shaft is greater than the third prescribed value, said control means compares the number of revolutions of the output shaft and the number of revolutions of the input shaft with a fourth prescribed value and a fifth prescribed value, respectively;

when said control means determines that the number of revolutions of the output shaft and the number of revolutions of the input shaft are smaller than the fourth prescribed value and the fifth prescribed value, respectively, said control means compares the number of revolutions of the engine with a sixth prescribed value; and when said control means determines that the number of revolutions of the engine is smaller than the sixth prescribed value, said control means releases the temporary gear change prohibiting process.

6. An electronically controlled automatic transmission according to claim 5, wherein when said control means releases the temporary gear change prohibiting process, said control means performs a slow shift-down operation for shifting down the automatic transmission slower than the normal state.

7. An electronically controlled automatic transmission according to claim 6, wherein said control means determines the gear position of the automatic transmission when it performs the slow shift-down operation, and when said control means confirms that the gear position is on a lowest speed side, said control means releases the slow shift-down operation.

* * * * *